United States Patent
Tamrakar et al.

(10) Patent No.: US 11,419,070 B2
(45) Date of Patent: Aug. 16, 2022

(54) METHODS FOR ACQUIRING AND TRANSMITTING SYSTEM INFORMATION, TERMINAL, NETWORK RECEPTION AND TRANSMISSION NODE AND STORAGE MEDIUM

(71) Applicant: CHINA ACADEMY OF TELECOMMUNICATIONS TECHNOLOGY, Beijing (CN)

(72) Inventors: Rakesh Tamrakar, Beijing (CN); Runhua Chen, Beijing (CN); Qiubin Gao, Beijing (CN); Qiuping Huang, Beijing (CN); Hui Li, Beijing (CN); Chuanjun Li, Beijing (CN); Yang Song, Beijing (CN); Xin Su, Beijing (CN); Yu Yang, Beijing (CN); Mengjun Wang, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 16/323,242

(22) PCT Filed: Jul. 17, 2017

(86) PCT No.: PCT/CN2017/093131
§ 371 (c)(1),
(2) Date: Feb. 4, 2019

(87) PCT Pub. No.: WO2018/024091
PCT Pub. Date: Feb. 8, 2018

(65) Prior Publication Data
US 2019/0174439 A1 Jun. 6, 2019

(30) Foreign Application Priority Data
Aug. 5, 2016 (CN) .......................... 201610637827.2

(51) Int. Cl.
*H04W 56/00* (2009.01)
*H04L 5/00* (2006.01)
(Continued)

(52) U.S. Cl.
CPC .......... *H04W 56/001* (2013.01); *H04L 5/005* (2013.01); *H04L 5/0053* (2013.01);
(Continued)

(58) Field of Classification Search
None
See application file for complete search history.

(56) References Cited

U.S. PATENT DOCUMENTS

2014/0301353 A1\* 10/2014 Frenne .................. H04L 5/0005
370/330
2015/0201448 A1 7/2015 Yang et al.
(Continued)

FOREIGN PATENT DOCUMENTS

| CN | 101166365 A | 4/2008 |
|---|---|---|
| CN | 101202585 A | 6/2008 |

(Continued)

OTHER PUBLICATIONS

Extended European Search Report from EP app. No. 17836273.7, dated Aug. 13, 2019.
(Continued)

*Primary Examiner* — Rebecca E Song
(74) *Attorney, Agent, or Firm* — Ladas & Parry, LLP (57) ABSTRACT

A method for acquiring system information, a method for transmitting system information, a terminal, a network reception and transmission node and a storage medium are provided. The method for acquiring the system information includes: receiving a synchronization signal transmitted from a network reception and transmission node, and acquiring feature information of the synchronization signal, node information of the network reception and transmission node and a correspondence between the feature information and a transmitting position of the system information; acquiring the transmitting position of the system information corresponding to the node information based on the feature information and the correspondence; and receiving, at the transmitting position of the system information, the system information transmitted from the network reception and transmission node.

6 Claims, 3 Drawing Sheets

(51) Int. Cl.
*H04W 72/04* (2009.01)
*H04W 48/10* (2009.01)

(52) U.S. Cl.
CPC ..... *H04W 56/006* (2013.01); *H04W 72/0453* (2013.01); *H04W 72/0466* (2013.01); *H04W 48/10* (2013.01)

(56) References Cited

U.S. PATENT DOCUMENTS

| | | | | |
|---|---|---|---|---|
| 2016/0308637 | A1* | 10/2016 | Frenne | H04L 5/0048 |
| 2018/0034599 | A1* | 2/2018 | Zhou | H04W 72/042 |
| 2018/0175904 | A1* | 6/2018 | Ko | H04W 72/005 |
| 2019/0029003 | A1* | 1/2019 | Takeda | H04W 72/04 |

FOREIGN PATENT DOCUMENTS

| | | | |
|---|---|---|---|
| CN | 101651988 A | 2/2010 | |
| JP | 5134710 B2 * | 1/2013 | ........... H04L 1/0046 |
| WO | 2015080646 A1 | 6/2015 | |

OTHER PUBLICATIONS

"RAN1 agreements for Rel-13 eMTC sorted and edited by topic", R1-161546, 3GPP TSG RAN WG1 Meeting #84, St. Julian's, Malta, Feb. 15-19, 2016.
Written Opinion of the International Searching Authority from PCT/CN2017/093131, dated Aug. 30, 2017, with English translation from WIPO.
International Preliminary Report on Patentability, from PCT/CN2017/093131, dated Feb. 5, 2019, with English translation from WIPO.
International Search Report for PCT/CNM17/093131 dated Aug. 30, 2017 and its English translation provided by WIPO.
Written Opinion of the International Search Authority PCT/CN2017/093131 dated Aug. 30, 2017 and its English translation provided by Google Translate.

* cited by examiner

METHODS FOR ACQUIRING AND TRANSMITTING SYSTEM INFORMATION, TERMINAL, NETWORK RECEPTION AND TRANSMISSION NODE AND STORAGE MEDIUM

CROSS-REFERENCE TO RELATED APPLICATIONS

This application is the U.S. national phase of PCT Application No. PCT/CN2017/093131 filed on Jul. 17, 2017, which claims a priority to Chinese Patent Application No. 201610637827.2 filed on Aug. 5, 2016, the disclosures of which are incorporated in their entireties by reference herein.

TECHNICAL FIELD

The present disclosure relates to the field of communication technology, and in particular to a method for acquiring system information, a method for transmitting system information, a terminal, a network reception and transmission node and a storage medium.

BACKGROUND

A communication system may include one or more network nodes to communicate with user equipment (UE). After startup, the UE needs to find at least one node and perform access via the node so as to access a network. If a network includes multiple nodes, the UE may access the network via an arbitrary node among the multiple nodes. Taking a cellular system as an example, each network node may be configured as one cell, each cell transmits a different signal, the UE detects signals from different cells and identifies a suitable cell to access a network, and such a procedure is called as initial access. In the cellular system, the UE needs to perform cell identification in the initial access (to find a suitable network for accessing), and additionally, the UE may also need to perform cell identification in cell re-selection or in a connected state, to identify a suitable cell to reside or to report a switching request to a base station.

In addition, a Long-Term Evolution (LTE) system carries identification information of a cell via a synchronization signal (Sync). The synchronization signal of the LTE system includes two parts: Primary Synchronization Signal (PSS) and Secondary Synchronization Signal (SSS). A base station of a cell may have one or more transmitting antennas. After beamforming, PSS/SSS is transmitted on the multiple antennas. Since PSS/SSS is designed to enable all users in the cell to perform access, a beamforming solution needs to ensure wide beamforming such that the PSS/SSS can be received by all the users in the cell. Hence, each cell transmits one PSS/SSS signal, and the signals and cell identities (Cell ID) of cells are in a one-to-one correspondence. After detecting the PSS/SSS of a cell, the UE obtains the cell ID of the cell and identifies the cell. In the LTE system, the PSS/SSS has a bandwidth of 6 physical resource blocks (PRE) and is restrained to be transmitted at a center of a bandwidth of the cell.

Conventional systems are mainly deployed in low frequency bands, and the quantity of antennas at a node side is relatively small. Future systems may be deployed based on a large bandwidth from 0.4 GHz to 100 GHz, channel performance in a low frequency band significantly differs from that in a high frequency band, path loss of a high frequency band is much higher than that of a low frequency band, a coverage of the cell is severely decreased, and thus, new design of synchronization and initial access signals is needed to ensure a sufficient network coverage. In future network, there may be multiple transmit or receive points (TRP) in one cell and the TRPs are each identified with a different ID. In addition, the quantity of antennas of a future system may be greatly increased to hundreds or even thousands, the great quantity of antennas may generate narrow beams with a beamforming technique, and coverage of a beam may be improved by a gain of the beam. However, an angle covered by each beam turns smaller as the beam turns narrower, and the cell requires multiple beams orienting different directions to achieve coverage of the whole cell. Hence, effects of the above deployments need to be taken into consideration in designing synchronization and initial access signals of future system, a solution that each cell transmits one PSS/SSS is not sufficient to provide enough coverage for the cell, and the restriction of transmitting the PSS/SSS at the center of the bandwidth of the cell cannot satisfy a requirement of flexible coverage. Synchronization signal and system information of the future system needs to be reconsidered, and synchronization signals and pieces of system information in the LTE system may not be in a one-to-one correspondence.

That is, in the related technology, the network side transmits only one synchronization signal and the system information is transmitted at a fixed position, while in the future system, the network side may transmit multiple synchronization signals and there may be multiple pieces of system information, hence, a conventional terminal cannot correctly acquire a frequency domain position and a time domain position where the network side transmits the system information, and then cannot correctly interpret the system information.

SUMMARY

The present disclosure is to provide a method for acquiring system information, a method for transmitting system information, a terminal and a network reception and transmission node, which addresses an issue in the related technology that a terminal cannot interpret system information correctly in a case that pieces of system information and synchronization signals are not in a one-to-one correspondence.

In view of the above issue, a method for acquiring system information is provided in an embodiment of the present disclosure.

The method includes: receiving a synchronization signal transmitted from a network reception and transmission node, and acquiring feature information of the synchronization signal, node information of the network reception and transmission node, and a correspondence between the feature information and a transmitting position of the system information; acquiring the transmitting position of the system information corresponding to the node information based on the feature information and the correspondence; and receiving, at the transmitting position of the system information, the system information transmitted from the network reception and transmission node.

Optionally, acquiring the correspondence between the feature information and the transmitting position of the system information includes: directly acquiring a locally pre-stored correspondence between the feature information and the transmitting position of the system information; or acquiring a correspondence between the feature information and the transmitting position of the system information based on the node information.

Optionally, acquiring the transmitting position of the system information corresponding to the node information based on the feature information and the correspondence includes: acquiring a frequency domain transmitting position or a time domain transmitting position of the system information based on the feature information and the correspondence.

Optionally, acquiring the frequency domain transmitting position of the system information based on the feature information and the correspondence includes: determining a frequency domain transmitting position range of the system information based on a center frequency of the synchronization signal and the correspondence, or determining a frequency domain transmitting position range of the system information based on a sequence of the synchronization signal and the correspondence, or determining a frequency domain transmitting position range of the system information based on a scrambling code sequence of the synchronization signal and the correspondence, or determining a frequency domain transmitting position range of the system information based on a frequency domain position of the synchronization signal and the correspondence; and acquiring the frequency domain transmitting position of the system information from the frequency domain transmitting position range.

Optionally, acquiring the time domain transmitting position of the system information based on the feature information and the correspondence includes: determining a time domain transmitting position range of the system information based on a center frequency of the synchronization signal and the correspondence, or determining a time domain transmitting position range of the system information based on a sequence of the synchronization signal and the correspondence, or determining a time domain transmitting position range of the system information based on a scrambling code sequence of the synchronization signal and the correspondence; and acquiring the time domain transmitting position of the system information from the time domain transmitting position range.

A method for transmitting system information is further provided in the present disclosure. The method includes: transmitting a synchronization signal to a terminal; acquiring feature information of the synchronization signal and a correspondence between the feature information and a transmitting position of the system information, and determining the transmitting position of the system information based on the feature information and the correspondence; and transmitting the system information at the transmitting position.

Optionally, determining the transmitting position of the system information based on the feature information and the correspondence includes: acquiring a frequency domain transmitting position or a time domain transmitting position of the system information based on the feature information and the correspondence.

Optionally, acquiring the frequency domain transmitting position of the system information based on the feature information and the correspondence includes: determining a frequency domain transmitting position range of the system information based on a center frequency of the synchronization signal and the correspondence, or determining a frequency domain transmitting position range of the system information based on a sequence of the synchronization signal and the correspondence, or determining a frequency domain transmitting position range of the system information based on a scrambling code sequence of the synchronization signal and the correspondence, or determining a frequency domain transmitting position range of the system information based on a frequency domain position of the synchronization signal and the correspondence; and acquiring the frequency domain transmitting position of the system information from the frequency domain transmitting position range.

Optionally, acquiring the time domain transmitting position of the system information based on the feature information and the correspondence includes: determining a time domain transmitting position range of the system information based on a center frequency of the synchronization signal and the correspondence, or determining a time domain transmitting position range of the system information based on a sequence of the synchronization signal and the correspondence, or determining a time domain transmitting position range of the system information based on a scrambling code sequence of the synchronization signal and the correspondence; and acquiring the time domain transmitting position of the system information from the time domain transmitting position range.

Optionally, the method further includes: presetting the correspondence between the feature information and the transmitting position of the system information.

A terminal is further provided in the present disclosure, including: a first processing module, configured to receive a synchronization signal transmitted from a network reception and transmission node, and acquire feature information of the synchronization signal, node information of the network reception and transmission node, and a correspondence between the feature information and a transmitting position of system information; a second processing module, configured to acquire the transmitting position of the system information corresponding to the node information based on the feature information and the correspondence; and a receiving module, configured to receive, at the transmitting position of the system information, the system information transmitted from the network reception and transmission node.

Optionally, the first processing module includes: an acquiring sub-module, configured to directly acquire a locally pre-stored correspondence between the feature information and the transmitting position of the system information; or a first processing sub-module, configured to acquire a correspondence between the feature information and the transmitting position of the system information based on the node information.

Optionally, the second processing module includes a second processing sub-module, configured to acquire a frequency domain transmitting position or a time domain transmitting position of the system information based on the feature information and the correspondence.

Optionally, the second processing sub-module includes: a first determining unit, configured to determine a frequency domain transmitting position range of the system information based on a center frequency of the synchronization signal and the correspondence, or determine a frequency domain transmitting position range of the system information based on a sequence of the synchronization signal and the correspondence, or determine a frequency domain transmitting position range of the system information based on a scrambling code sequence of the synchronization signal and the correspondence, or determine a frequency domain transmitting position range of the system information based on a frequency domain position of the synchronization signal and the correspondence; and a first processing unit, configured to acquire the frequency domain transmitting position of the system information from the frequency domain transmitting position range.

Optionally, the second processing sub-module includes: a second determining unit, configured to determine a time domain transmitting position range of the system information based on a center frequency of the synchronization signal and the correspondence, or determine a time domain transmitting position range of the system information based on a sequence of the synchronization signal and the correspondence, or determine a time domain transmitting position range of the system information based on a scrambling code sequence of the synchronization signal and the correspondence; and a second processing unit, configured to acquire the time domain transmitting position of the system information from the time domain transmitting position range.

A network reception and transmission node is further provided in the present disclosure, including: a first transmitting module, configured to transmit a synchronization signal to a terminal; a third processing module, configured to acquire feature information of the synchronization signal, and a correspondence between the feature information and a transmitting position of system information, and determine the transmitting position of the system information based on the feature information and the correspondence; and a second transmitting module, configured to transmit the system information at the transmitting position.

Optionally, the third processing module includes: a third processing sub-module, configured to acquire a frequency domain transmitting position or a time domain transmitting position of the system information based on the feature information and the correspondence.

Optionally, the third processing sub-module includes: a third determining unit, configured to determine a frequency domain transmitting position range of the system information based on a center frequency of the synchronization signal and the correspondence, or determine a frequency domain transmitting position range of the system information based on a sequence of the synchronization signal and the correspondence, or determine a frequency domain transmitting position range of the system information based on a scrambling code sequence of the synchronization signal and the correspondence, or determine a frequency domain transmitting position range of the system information based on a frequency domain position of the synchronization signal and the correspondence; and a third processing unit, configured to acquire the frequency domain transmitting position of the system information from the frequency domain transmitting position range.

Optionally, the third processing sub-module includes: a fourth determining unit, configured to determine a time domain transmitting position range of the system information based on a center frequency of the synchronization signal and the correspondence, or determine a time domain transmitting position range of the system information based on a sequence of the synchronization signal and the correspondence, or determine a time domain transmitting position range of the system information based on a scrambling code sequence of the synchronization signal and the correspondence; and a fourth processing unit, configured to acquire the time domain transmitting position of the system information from the time domain transmitting position range.

Optionally, the network reception and transmission node further includes a setting module, configured to preset the correspondence between the feature information and the transmitting position of the system information.

A terminal is further provided in the present disclosure, including a processor and a transceiver configured to receive and transmit data under control of the processor. The processor is configured to; receive a synchronization signal transmitted from a network reception and transmission node, and acquire feature information of the synchronization signal, node information of the network reception and transmission node, and a correspondence between the feature information and a transmitting position of system information; acquire the transmitting position of the system information corresponding to the node information based on the feature information and the correspondence; and receive, at the transmitting position of the system information, the system information transmitted from the network reception and transmission node.

A network reception and transmission node is further provided in the present disclosure, including a processor and a transceiver configured to receive and transmit data under control of the processor. The processor is configured to: transmit a synchronization signal to a terminal; acquire feature information of the synchronization signal, and a correspondence between the feature information and a transmitting position of system information, and determine the transmitting position of the system information based on the feature information and the correspondence; and transmit the system information at the transmitting position.

A non-volatile computer readable storage medium is further provided in the present disclosure, which stores computer readable instructions thereon. The computer readable instructions are executable by a processor, and when executing the computer readable instructions, the processor performs following operations: receiving a synchronization signal transmitted from a network reception and transmission node, and acquiring feature information of the synchronization signal, node information of the network reception and transmission node, and a correspondence between the feature information and a transmitting position of system information; acquiring the transmitting position of the system information corresponding to the node information based on the feature information and the correspondence; and receiving, at the transmitting position of the system information, the system information transmitted from the network reception and transmission node.

A non-volatile computer readable storage medium is further provided in the present disclosure, which stores computer readable instructions thereon. The computer readable instructions are executable by a processor, and when executing the computer readable instructions, the processor performs following operations: transmitting a synchronization signal to a terminal; acquiring feature information of the synchronization signal, and a correspondence between the feature information and a transmitting position of system information, and determining the transmitting position of the system information based on the feature information and the correspondence; and transmitting the system information at the transmitting position.

The technical solutions of the present disclosure have the following beneficial effects. In the above solutions, the transmitting position of the system information of a corresponding network reception and transmission node is acquired based on the feature information of the synchronization signal and the correspondence between the feature information and the transmitting position of the system information according to the method for acquiring the system information, the system information can be interpreted accurately and a problem in the related technology that a terminal cannot interpret system information accu-

DETAILED DESCRIPTION

Detailed descriptions are provided in conjunction with drawings and embodiments to better clarify technical problem to be solved, technical solutions and advantages of the present disclosure.

Regarding a problem in the related technology that a terminal cannot interpret system information correctly in a case that synchronization signals and pieces of system information are not in a one-to-one correspondence, the present disclosure provides various solutions detailed as follows.

Figure 1:
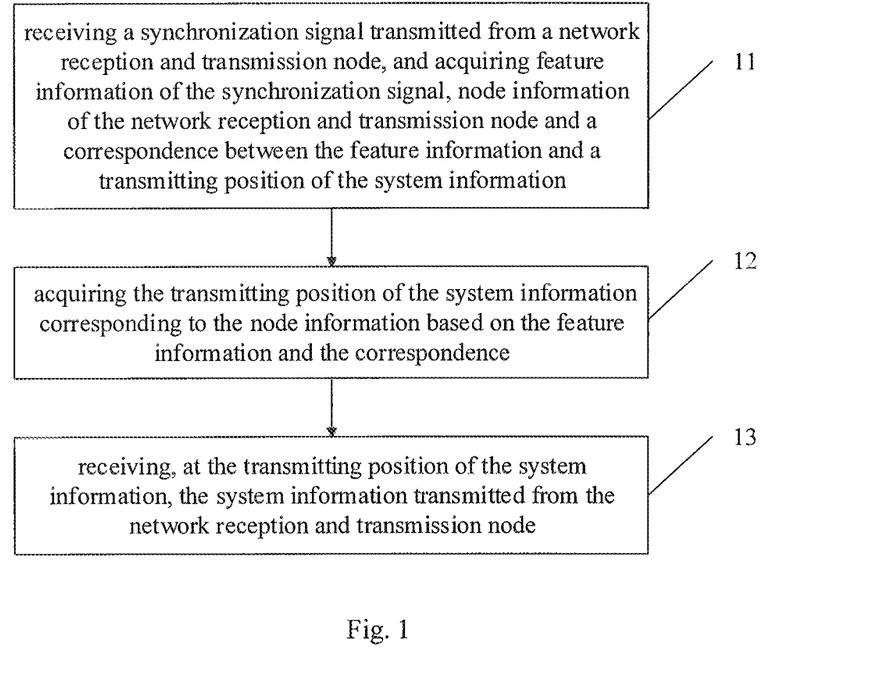
FIG. 1 is a flow chart of a method for acquiring system information according to an embodiment of the present disclosure.

A method for acquiring system information is provided according to an embodiment of the present disclosure. The acquiring method may be applied to a terminal side. The acquiring method includes:

step 11: receiving a synchronization signal transmitted from a network reception and transmission node and acquiring feature information of the synchronization signal, node information of the network reception and transmission node and a correspondence between the feature information and a transmitting position of the system information;

step 12: acquiring the transmitting position of the system information corresponding to the node information based on the feature information and the correspondence; and step 13: receiving at the transmitting position of the system information the system information transmitted from the network reception and transmission node.

The quantity of the synchronization signal may be one or may be more than one, which may belong to a same cell or different cells. The correspondence may be pre-stored locally or may be acquired from information received by the terminal.

Correspondences, between the feature information and the transmitting position of the system information and corresponding to network reception and transmission nodes, may be completely consistent, partially consistent or different from each other. In view of this, in an embodiment of the present disclosure, acquiring the correspondence between the feature information and the transmitting position of the system information may include: directly acquiring a locally pre-stored correspondence between the feature information and the transmitting position of the system information (which corresponds to a case of being completely consistent); or, acquiring a correspondence between the feature information and the transmitting position of the system information based on the node information (which corresponds to a case of being partially consistent or different from each other).

Specifically, acquiring the transmitting position of the system information corresponding to the node information based on the feature information and the correspondence includes: acquiring a frequency domain transmitting position or a time domain transmitting position of the system information based on the feature information and the correspondence.

In an embodiment of the present disclosure, the feature information of the synchronization signal includes at least one of or more than one of a center frequency, a sequence, a scrambling code sequence or a frequency domain position.

Correspondingly, acquiring the frequency domain transmitting position of the system information based on the feature information and the correspondence includes: determining a frequency domain transmitting position range of the system information based on the center frequency of the synchronization signal and the correspondence, or determining a frequency domain transmitting position range of the system information based on the sequence of the synchronization signal and the correspondence, or determining a frequency domain transmitting position range of the system information based on the scrambling code sequence of the synchronization signal and the correspondence, or determining a frequency domain transmitting position range of the system information based on the frequency domain position of the synchronization signal and the correspondence; and acquiring the frequency domain transmitting position of the system information from the frequency domain transmitting position range.

The frequency domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

Correspondingly, acquiring the time domain transmitting position of the system information based on the feature information and the correspondence includes: determining a time domain transmitting position range of the system information based on the center frequency of the synchronization signal and the correspondence, or determining a time domain transmitting position range of the system information based on the sequence of the synchronization signal and the correspondence, or determining a time domain transmitting position range of the system information based on the scrambling code sequence of the synchronization signal and the correspondence; and acquiring the time domain transmitting position of the system information from the time domain transmitting position range.

The time domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

From the above, in the method for acquiring the system information according to the embodiment of the present disclosure, the transmitting position of the system information of a corresponding network reception and transmission node is acquired based on the feature information of the synchronization signal and the correspondence between the feature information and the transmitting position of the system information, the system information can be interpreted accurately and a problem in the related technology that a terminal cannot interpret system information accurately in a case that synchronization signals and pieces of system information are not in a one-to-one correspondence can be solved.

Figure 2:
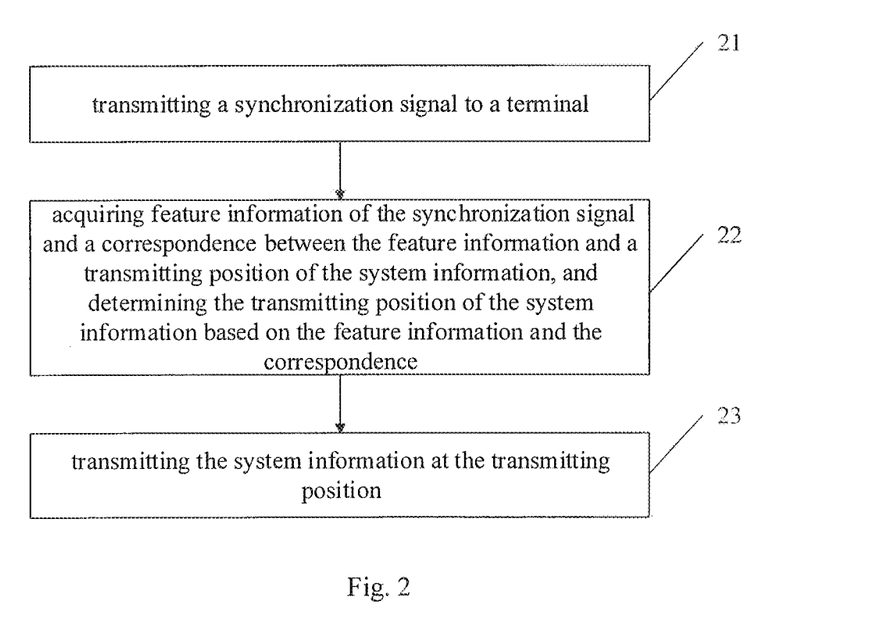
FIG. 2 is a flow chart of a method for transmitting system information according to an embodiment of the present disclosure.

A method for transmitting system information is provided according to an embodiment of the present disclosure. The transmitting method may be applied to a network side. As shown in FIG. 2, the transmitting method includes:

step 21: transmitting a synchronization signal to a terminal;

step 22: acquiring feature information of the synchronization signal and a correspondence between the feature information and a transmitting position of the system information and determining the transmitting position of the system information based on the feature information and the correspondence; and step 23: transmitting the system information at the transmitting position.

The quantity of the synchronization signal may be one or may be more than one. The correspondence may be stored locally or acquired elsewhere, which is not limited herein.

Specifically, determining the transmitting position of the system information based on the feature information and the correspondence includes; acquiring, a frequency domain transmitting position or a time domain transmitting position of the system information based on the feature information and the correspondence.

In an embodiment of the present disclosure, the feature information of the synchronization signal includes at least one of or more than one of a center frequency, a sequence, a scrambling code sequence or a frequency domain position.

Correspondingly, acquiring the frequency domain transmitting position of the system information based on the feature information and the correspondence includes: determining a frequency domain transmitting position range of the system information based on the center frequency of the synchronization signal and the correspondence, or determining a frequency domain transmitting position range of the system information based on the sequence of the synchronization signal and the correspondence, or determining a frequency domain transmitting position range of the system information based on the scrambling code sequence of the synchronization signal and the correspondence, or determining a frequency domain transmitting position range of the system information based on the frequency domain position of the synchronization signal and the correspondence; and acquiring the frequency domain transmitting position of the system information from the frequency domain transmitting position range.

The frequency domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

Correspondingly, acquiring the time domain transmitting position of the system information based on the feature information and the correspondence includes: determining a time domain transmitting position range of the system information based on the center frequency of the synchronization signal and the correspondence, or determining a time domain transmitting position range of the system information based on the sequence of the synchronization signal and the correspondence, or determining a time domain transmitting position range of the system information based on the scrambling code sequence of the synchronization signal and the correspondence; and acquiring the time domain transmitting position of the system information from the time domain transmitting position range.

The time domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

Furthermore, the transmitting method further includes: presetting the correspondence between the feature information and the transmitting position of the system information, for utilization while transmitting the synchronization signal; determining the feature information of the synchronization signal to be transmitted, and acquiring the transmitting position of the system information based on the feature information and the correspondence, and performing transmission (the synchronization signal and the position of the system information are neither fixed nor unique).

In the method for transmitting the system information according to the embodiments of the present disclosure, the transmitting position of the system information of the corresponding network reception and transmission node is acquired based on the feature information of the synchronization signal and the correspondence between the feature information and the transmitting position of the system information, and the system information is transmitted on the transmitting position; hence, the terminal side can accurately interpret the system information after acquiring the synchronization signal and the correspondence, and a problem in the related technology that a terminal cannot interpret system information accurately in a case that synchronization signals and pieces of system information are not in a one-to-one correspondence can be solved.

Hereinafter the technical solutions provided in the embodiments of the present disclosure are detailed based on a terminal side and a network side.

The solutions provided in the embodiments of the present disclosure may be described as a method for acquiring system information performed by a terminal in a communication system by detecting a synchronization signal, which specifically includes the following processes.

a) A network side in the communication system transmits one or more synchronization signals, and the terminal searches for and correctly detects (identify, and match a network reception and transmission node based on a sequence of the synchronization signal) the synchronization signal.

b) The terminal determines, based on feature information of the synchronization signal, a frequency domain position where the network side transmits system information, and specifically determines according to the following relationships:

i. a center frequency of the synchronization signal is the same as a center frequency of the frequency domain position where the network side transmits the system information; or ii. the sequence of the synchronization signal has a default relationship with the frequency domain position where the network side transmits the system information, for example, sequence 1 corresponds to default frequency domain position A and sequence 2 corresponds to default frequency domain position B; or iii. the scrambling code sequence of the synchronization signal has a default relationship with the frequency domain position where the network side transmits the system information, for example, scrambling code sequence 1 corresponds to default frequency domain position A and scrambling code sequence 2 corresponds to default frequency domain position B; or iv. the frequency domain position or the sequence or the scrambling code sequence of the synchronization signal is directed to N1 possible frequency domain positions where the network side transmits the system information, where N1 is a natural number equal to or larger than 1.

Some kinds of feature information of the synchronization signal are given hereinabove and other kinds of feature information of the synchronization signal may be applied. The default relationship may be a relationship that a preset quantity of symbols exist between two positions or the like.

c) The terminal determines, based on feature information of the synchronization signal, a time domain position where the network side transmits system information, and specifically determines according to the following relationships:

i. a center frequency of the synchronization signal has a default relationship with the time domain position where the network side transmits the system information, for example, there is a time difference of N2 symbols between the center frequency of the synchronization signal and the time domain position, where N2 is a natural number equal to or larger than 1; or ii. the sequence of the synchronization signal has a default relationship with the time domain position where the network side transmits the system information, for example, there is a time difference of M1 symbols or T1 microseconds between the sequence of the synchronization signal and the time domain position, where M1 and T1 both are natural numbers equal to or larger than 1 or a scrambling code sequence of the synchronization signal has a default relationship with the time domain position where the network side transmits the system information, for example, there is a time difference of M2 symbols or T2 microseconds between the scrambling code sequence of the synchronization signal and the time domain position, where M2 and T2 both are natural numbers equal to or larger than 1; or iv. the sequence or the scrambling code sequence of the synchronization signal is directed to P possible time domain positions where the network side transmits the system information, where P is a natural number equal to or larger than 1.

Some kinds of feature information of the synchronization signal are given hereinabove and other kinds of feature information of the synchronization signal may be applied.

d) After determining the time domain position and the frequency domain position of the system information, the terminal interprets the system information.

In the embodiment of the present disclosure, the system information is information about the network side that is needed by the terminal side to perform communication normally.

In conclusion, in the solutions provided in the embodiments of the present disclosure, after the synchronization signal is received correctly, the frequency domain position and the time domain position where the network side transmits the system information are determined based on the correspondence between the feature information of the synchronization signal and the transmitting position of the system information; hence, a problem that a terminal cannot interpret system information correctly in a case that synchronization signals and pieces of system information are not in a one-to-one correspondence is well solved.

Figure 3:
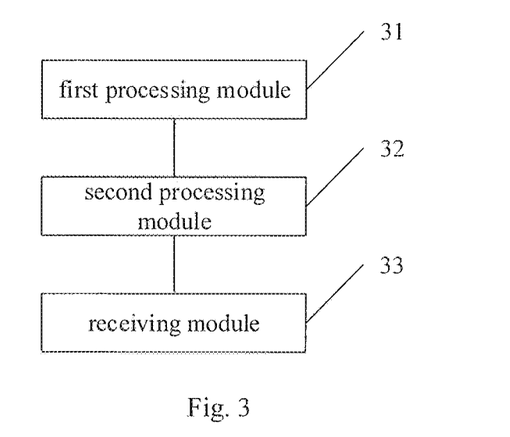
FIG. 3 is a schematic structural diagram of a terminal according to an embodiment of the present disclosure.

As shown in FIG. 3, a terminal according to an embodiment of the present disclosure includes:

a first processing module 31, configured to receive a synchronization signal transmitted from a network reception and transmission node and acquire feature information of the synchronization signal, node information of the network reception and transmission node and a correspondence between the feature information and a transmitting position of system information;

a second processing module 32, configured to acquire the transmitting position of the system information corresponding to the node information based on the feature information and the correspondence; and a receiving module 33, configured to receive, at the transmitting position of the system information, the system information transmitted from the network reception and transmission node.

The quantity of the synchronization signal may be one or may be more than one, which may belong to a same cell or different cells. The correspondence may be pre-stored locally or may be acquired from information received by the terminal.

Correspondences, between the feature information and the transmitting position of the system information and corresponding to respective network reception and transmission nodes, may be completely consistent, partially consistent or different from each other. In view of this, in an embodiment of the present disclosure, the first processing module includes: an acquiring sub-module, configured to directly acquire a locally pre-stored correspondence between the feature information and the transmitting position of the system information; or a first processing sub-module, configured to acquire a correspondence between the feature information and the transmitting position of the system information based on the node information.

Specifically, the second processing module includes a second processing sub-module, configured to acquire a frequency domain transmitting position or a time domain transmitting position of the system information based on the feature information and the correspondence.

In an embodiment of the present disclosure, the feature information of the synchronization signal includes at least one of or more than one of a center frequency, a sequence, a scrambling code sequence or a frequency domain position.

Correspondingly, the second processing sub-module includes: a first determining unit, configured to determine a frequency domain transmitting position range of the system information based on the center frequency of the synchronization signal and the correspondence, or determine a frequency domain transmitting position range of the system information based on the sequence of the synchronization signal and the correspondence, or determine a frequency domain transmitting position range of the system information based on the scrambling code sequence of the synchronization signal and the correspondence or determine a frequency domain transmitting, position range of the system information based on the frequency domain position of the synchronization signal and the correspondence; and a first processing unit, configured to acquire the frequency domain transmitting position of the system information from the frequency domain transmitting position range.

The frequency domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

Correspondingly, the second processing sub-module includes: a second determining unit, configured to determine a time domain transmitting position range of the system information based on the center frequency of the synchronization signal and the correspondence, or determine a time domain transmitting position range of the system information based on the sequence of the synchronization signal and the correspondence, or determine a time domain transmitting position range of the system information based on the scrambling code sequence of the synchronization signal and the correspondence; and a second processing unit, configured to acquire the time domain transmitting position of the system information from the time domain transmitting position range.

The time domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

From the above, with the terminal according to the embodiments of the present disclosure, the transmitting position of the system information of a corresponding network reception and transmission node is acquired based on the feature information of the synchronization signal and the correspondence between the feature information and the transmitting position of the system information, the system information can be interpreted accurately and a problem in the related technology that a terminal cannot interpret system information accurately in a ease that synchronization signals and pieces of system information are not in a one-to-one correspondence can be solved.

It should be noted, the terminal in the embodiments of the present disclosure is a terminal corresponding to the method for acquiring the system information at the terminal side provided in the foregoing embodiments of the present disclosure. Consequently, all implementations of the method for acquiring the system information provided in the foregoing embodiments are applicable to the terminal, and same or similar beneficial effects can be achieved.

Figure 4:
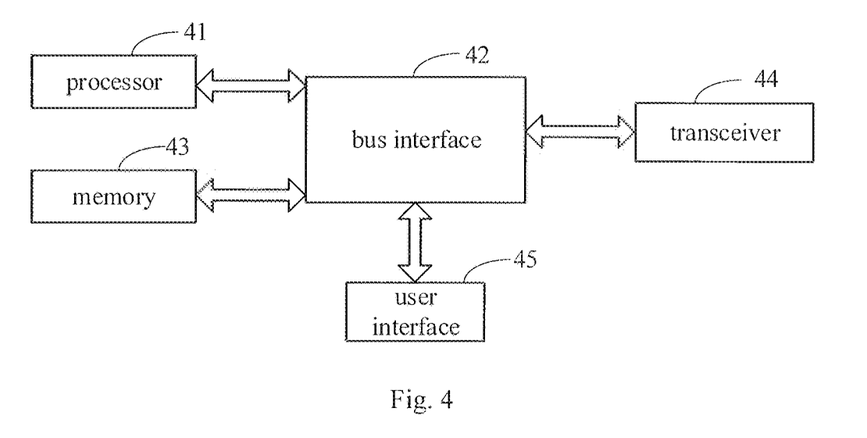
FIG. 4 is a schematic structural diagram of a terminal according to an embodiment of the present disclosure.

A terminal is provided according to an embodiment of the present disclosure. As shown in FIG. 4, the terminal includes: a processor 41, and a memory 43 connected to the processor 41 via a bus interface 42. The memory 43 is configured to store programs and data to be used by the processor 41 when executing operations. When calling and executing the programs and data stored in the memory 43, the processor 41 performs the following process: receiving, via a transceiver 44, a synchronization signal transmitted from a network reception and transmission node, and acquiring feature information of the synchronization signal, node information of the network reception and transmission node and a correspondence between the feature information and a transmitting position of system information; acquiring the transmitting position of the system information corresponding to the node information based on the feature information and the correspondence; and receiving, at the transmitting position of the system information, via the transceiver 44, the system information transmitted from the network reception and transmission node.

The transceiver 44 is connected with the bus interface 42 and is configured to receive and transmit data under control of the processor 41.

It should be noted, in FIG. 4, a bus architecture may include an arbitrary quantity of buses and bridges connected to each other. Various circuits of one or more processors represented by the processor 41 and a memory represented by the memory 43 are coupled. The bus architecture may further couple other circuits together, such as a periphery component, a voltage stabilizer and a power management circuit, which are well known in the art and not repeated herein. The bus interface provides an interface. The transceiver 44 may be multiple elements. i.e., including a receiver and a transmitter. The transceiver 44 provides a unit configured to communicate with other devices on a transmission medium. For different terminals, a user interface 45 may be an interface for internally or externally connecting needed devices including a keypad, a display, a loudspeaker, a microphone, an operating lever and so on. The processor 41 is in charge of management of the bus architecture and common processings. The memory 43 may store data used by the processor 41 when executing operations.

It can be understood by those skilled in the art, all or a part of steps for implementing the foregoing embodiment may be achieved by hardware or by hardware instructed by computer program. The computer program includes instructions to execute a part of or all of the steps of the above-mentioned method. The computer program may be stored in a readable storage medium, where the storage medium may be in any form.

Figure 5:
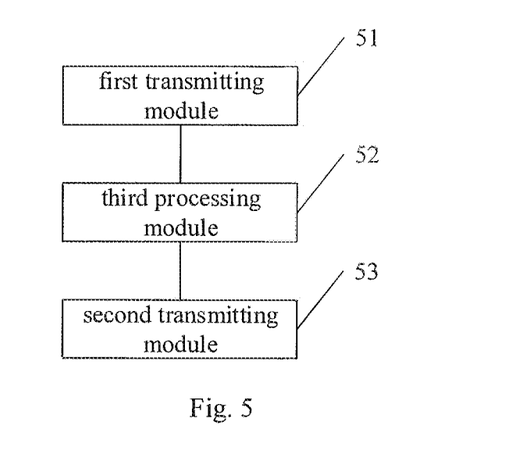
FIG. 5 is a schematic structural diagram of a network reception and transmission node according to an embodiment of the present disclosure.

A network reception and transmission node is provided according to an embodiment of the present disclosure. As shown in FIG. 5, the network reception and transmission node includes:

a first transmitting module 51, configured to transmit a synchronization signal to a terminal;

a third processing module 52, configured to acquire feature information of the synchronization signal and a correspondence between the feature information and a transmitting position of system information, and determine the transmitting position of the system information based on the feature information and the correspondence; and a second transmitting module 53, configured to transmit the system information at the transmitting position.

The quantity of the synchronization signal may be one or may be more than one. The correspondence may be stored locally or acquired elsewhere, which is not limited herein.

Specifically, the third processing module includes: a third processing sub-module, configured to acquire a frequency domain transmitting position or a time domain transmitting position of the system information based on the feature information and the correspondence.

In an embodiment of the present disclosure, the feature information of the synchronization signal includes at least one of or more than one of a center frequency, a sequence, a scrambling code sequence or a frequency domain position.

Correspondingly, the third processing sub-module includes: a third determining unit, configured to determine a frequency domain transmitting position range of the system information based on the center frequency of the synchronization signal and the correspondence, or determine a frequency domain transmitting position range of the system information based on the sequence of the synchronization signal and the correspondence, or determine a frequency domain transmitting position range of the system information based on the scrambling code sequence of the synchronization signal and the correspondence, or determine a frequency domain transmitting position range of the system information based on the frequency domain position of the synchronization signal and the correspondence; and a third processing unit, configured to acquire the frequency domain transmitting position of the system information from the frequency domain transmitting position range.

The frequency domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

Correspondingly, the third processing sub-module includes: a fourth determining unit, configured to determine a time domain transmitting position range of the system information based on the center frequency of the synchronization signal and the correspondence, or determine a time domain transmitting position range of the system information based on the sequence of the synchronization signal and the correspondence, or determine a time domain transmitting position range of the system information based on the scrambling code sequence of the synchronization signal and the correspondence; and a fourth processing unit, configured to acquire the time domain transmitting position of the system information from the time domain transmitting position range.

The time domain transmitting position range may be directed to only one certain position or multiple possible positions. That is to say, in the technical solutions of the present disclosure, one certain position may be provided and the system information is received at the position; or, a target position is determined by detecting at multiple possible positions and then the system information is received at the target position.

Furthermore, the network reception and transmission node further includes: a setting module, configured to preset the correspondence between the feature information and the transmitting position of the system information, so as to utilize while transmitting the synchronization signal: determine the feature information of the synchronization signal to be transmitted, and acquire the transmitting position of the system information based on the feature information and the correspondence, and perform transmission (the synchronization signal and the position of the system information are neither fixed nor unique).

With the network reception and transmission node according to the embodiments of the present disclosure, the transmitting position of the system information of the corresponding network reception and transmission node is acquired based on the feature information of the synchronization signal and the correspondence between the feature information and the transmitting position of the system information, and the system information is transmitted on the transmitting position; hence, the terminal side can accurately interpret the system information after acquiring the synchronization signal and the correspondence, and a problem in the related technology that a terminal cannot interpret system information accurately in a case that synchronization signals and pieces of system information are not in a one-to-one correspondence can be solved.

It should be noted, the network reception and transmission node in the embodiments of the present disclosure is a network reception and transmission node corresponding to the method for transmitting the system information at the network side provided in the foregoing embodiments of the present disclosure. Consequently, all implementations of the method for transmitting the system information provided in the foregoing embodiments are applicable to the network reception and transmission node and same or similar beneficial effects can be achieved.

Figure 6:
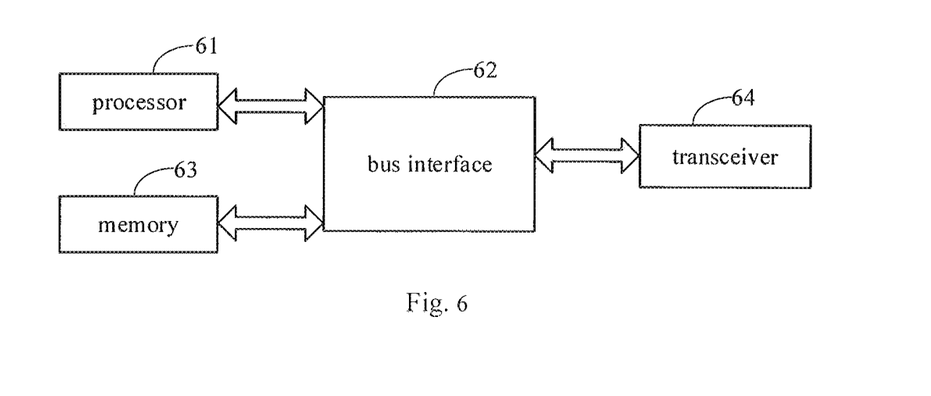
FIG. 6 is a schematic structural diagram of a base station according to an embodiment of the present disclosure.

A base station is provided according to an embodiment of the present disclosure. As shown in FIG. 6, the base station includes: a processor 61, and a memory 63 connected to the processor 61 via a bus interface 62. The memory 63 is configured to store programs and data to be used by the processor 61 when executing operations. When calling and executing the programs and data stored in the memory 63, the processor 61 performs the following process: transmitting, via a transceiver 64, a synchronization signal to a terminal; acquiring feature information of the synchronization signal and a correspondence between the feature information and a transmitting position of system information, and determining the transmitting position of the system information based on the feature information and the correspondence; and transmitting, via the transceiver 64, the system information at the transmitting position.

The transceiver 64 is connected with the bus interface 62 and is configured to receive and transmit data under control of the processor 61.

It should be noted, in FIG. 6, a bus architecture may include an arbitrary quantity of buses and bridges connected to each other. Various circuits of one or more processors represented by the processor 61 and a memory represented by the memory 63 are coupled. The bus architecture may further couple other circuits together, such as a periphery component, a voltage stabilizer and a power management circuit, which are well known in the art and not repeated herein. The bus interface provides an interface. The transceiver 44 may be multiple elements, i.e., including a receiver and a transmitter. The transceiver 64 provides a unit configured to communicate with other devices on a transmission medium. The processor 61 is in charge of management of the bus architecture and common processings. The memory 63 may store data used by the processor 61 when executing operations.

It can be understood by those skilled in the art, all or a part of steps for implementing the foregoing embodiments may be achieved by hardware or by hardware instructed by computer program. The computer program includes instructions to execute a part of or all of the steps of the above-mentioned method. The computer program may be stored in a readable storage medium, where the storage medium may be in any form.

It should be noted, many functional components are called as modules/sub-modules in the description, to particularly strengthen independence of their implementing manners.

In embodiments of the present disclosure, the modules/sub-modules/units may be implemented with software, to facilitate being executed by various kinds of processors. For example, an identified executable code module may include one or multiple physical or logic blocks of computer instructions, such as being constructed as objects, processes or functions. Despite all this, executable codes of the identified module do not need to be together physically and they may include different instructions stored at different positions. In a case of being integrated together logically, these instructions form the module and achieve a specified objective of the module.

In fact, the executable code module may have one single instruction or multiple instructions, or even may be distributed in different code segments, distributed in different programs and distributed in multiple memory devices. Similarly, processing data may be identified within the module, implemented in any appropriate manner and organized within a data structure of any appropriate type. The processing data may be collected as a single data set, or may be distributed at different positions (including being in different memory devices), and may at least partially function as an electronic signal and exist in a system or a network.

In a case that the modules may be implemented with software, those skilled in the art, while considering current hardware technique level and taking no account of cost, may build hardware circuits to implement corresponding functions for the modules that may be implemented with software. The hardware circuits may include normal very large scale integrated (VLSI) circuits, gate arrays, conventional semiconductors such as logic chips and transistors, or other separate elements. The modules may also be achieved with programmable hardware devices such as field-programmable gate arrays, programmable array logic and programmable logic devices.

Optional embodiments of the present disclosure are described hereinabove. It should be noted that various improvements and polishments can be made by those ordinary skilled in the art without departing from the principle of the present disclosure. The improvements and polishments fall within the protection scope of the present disclosure.

What is claimed is:

1. A method for obtaining system information, applied to a terminal side, applied in a scenario where a cell transmits a plurality of synchronization signals and has a plurality of pieces of system information and comprising:
    receiving a synchronization signal transmitted from a network reception and transmission node, and obtaining feature information of the synchronization signal, node information of the network reception and transmission node, and a correspondence between the feature information and a transmitting position of the system information;
    obtaining the transmitting position of the system information corresponding to the node information based on the feature information and the correspondence; and
    receiving, at the transmitting position of the system information, the system information transmitted from the network reception and transmission node;
    wherein obtaining the correspondence between the feature information and the transmitting position of the system information comprises: obtaining, by the terminal, a correspondence between the feature information and the transmitting position of the system information based on the node information; and wherein:
        the obtaining the transmitting position of the system information corresponding to the node information based on the feature information and the correspondence comprises:
    obtaining a frequency domain transmitting position and a time domain transmitting position of the system information based on the feature information and the correspondence, wherein the obtaining the frequency domain transmitting position of the system information based on the feature information and the correspondence comprises: determining a frequency domain transmitting position range of the system information based on a center frequency of the synchronization signal and the correspondence, and the obtaining the time domain transmitting position of the system information based on the feature information and the correspondence comprises: determining a time domain transmitting position range of the system information based on the center frequency of the synchronization signal and the correspondence, and the center frequency has a default relationship with the time domain transmitting position range of the system information.

2. The method according to claim 1, wherein the obtaining the transmitting position of the system information corresponding to the node information based on the feature information and the correspondence comprises:
    determining the frequency domain transmitting position of the system information based on the feature information and the correspondence, wherein the frequency domain transmitting position comprises a plurality of positions; and
    wherein the receiving, at the transmitting position of the system information, the system information transmitted from the network reception and transmission node comprises:
    detecting, at the plurality of positions of the frequency domain transmitting position, the system information transmitted from the network reception and transmission node.

3. A method for transmitting system information, applied to a network side, applied in a scenario where a cell transmits a plurality of synchronization signals and has a plurality of pieces of system information and comprising:
    transmitting a synchronization signal to a terminal;
    obtaining feature information of the synchronization signal, and a correspondence between the feature information and a transmitting position of the system information, and determining the transmitting position of the system information based on the feature information and the correspondence; and
    transmitting the system information at the transmitting position;
    wherein the method further comprises: presetting, by a network reception and transmission node, the correspondence between the feature information and the transmitting position of the system information, wherein the correspondence is determined based on node information of the network reception and transmission node; and wherein:
        the determining the transmitting position of the system information based on the feature information and the correspondence comprises: obtaining a frequency domain transmitting position and a time domain transmitting position of the system information based on the feature information and the correspondence, wherein the obtaining the frequency domain transmitting position of the system information based on the feature information and the correspondence comprises: determining a frequency domain transmitting position range of the system information based on a center frequency of the synchronization signal and the correspondence, and the obtaining the time domain transmitting position of the system information based on the feature information and the correspondence comprises: determining a time domain transmitting position range of the system information based on the center frequency of the synchronization signal and the correspondence, and the center frequency has a default relationship with the time domain transmitting position range of the system information.

4. A network reception and transmission node, applied in a scenario where a cell transmits a plurality of synchronization signals and has a plurality of pieces of system information and comprising a processor and a transceiver configured to receive and transmit data under control of the processor, wherein the processor is configured to perform steps of the method for transmitting the system information according to claim 3.

5. The method according to claim 3, wherein the determining the transmitting position of the system information based on the feature information and the correspondence comprises:
   determining the frequency domain transmitting position of the system information based on the feature information and the correspondence, wherein the frequency domain transmitting position comprises a plurality of positions.

6. A terminal, applied in a scenario where a cell transmits a plurality of synchronization signals and has a plurality of pieces of system information and comprising a processor and a transceiver configured to receive and transmit data under control of the processor, wherein the processor is configured to:
   receive a synchronization signal transmitted from a network reception and transmission node, and obtain feature information of the synchronization signal, node information of the network reception and transmission node, and a correspondence between the feature information and a transmitting position of the system information;
   obtain the transmitting position of the system information corresponding to the node information based on the feature information and the correspondence; and
   receive, at the transmitting position of the system information, the system information transmitted from the network reception and transmission node;
   wherein the processor is configured to: obtain a correspondence between the feature information and the transmitting position of the system information based on the node information; and wherein:
   the processor is configured to obtain a frequency domain transmitting position and a time domain transmitting position of the system information based on the feature information and the correspondence, wherein the obtaining the frequency domain transmitting position of the system information based on the feature information and the correspondence comprises: determining a frequency domain transmitting position range of the system information based on a center frequency of the synchronization signal and the correspondence, and the obtaining the time domain transmitting position of the system information based on the feature information and the correspondence comprises: determining a time domain transmitting position range of the system information based on the center frequency of the synchronization signal and the correspondence, and the center frequency has a default relationship with the time domain transmitting position range of the system information.

* * * * *